(No Model.)

H. KOEPP.
HOBBY HORSE.

No. 453,243. Patented June 2, 1891.

Witnesses.

Inventor.
Henry Koepp

UNITED STATES PATENT OFFICE.

HENRY KOEPP, OF MILWAUKEE, WISCONSIN.

HOBBY-HORSE.

SPECIFICATION forming part of Letters Patent No. 453,243, dated June 2, 1891.

Application filed February 28, 1891. Serial No. 383,234. (No model.)

*To all whom it may concern:*

Be it known that I, HENRY KOEPP, of Milwaukee, in the county of Milwaukee and State of Wisconsin, have invented a new and useful Improvement in Hobby-Horses, of which the following is a description, reference being had to the accompanying drawings, which are a part of this specification.

My invention relates to a hobby-horse provided with mechanism adapted to be operated by the rider, whereby the horse can be run ahead and guided, provision being also made for a yielding and comfortable seat for the rider.

Figure 1:
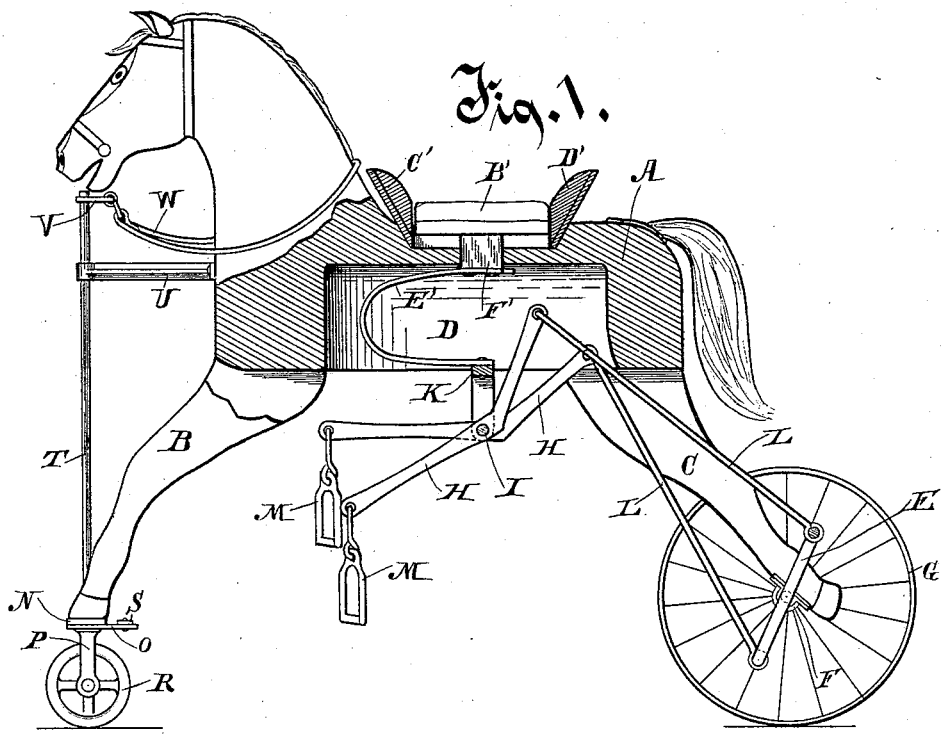
Figure 2:
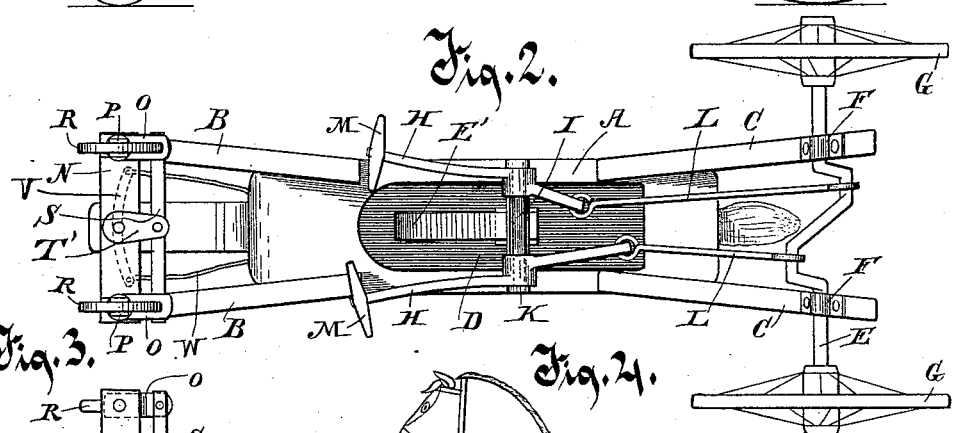
Figure 3:
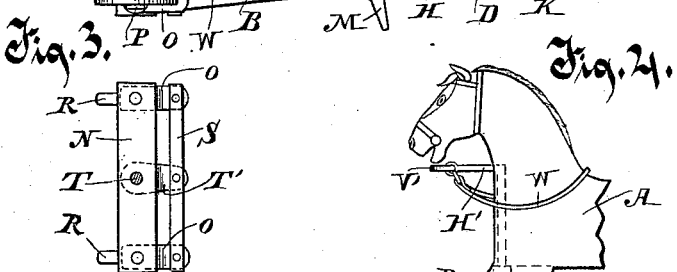
Figure 4:
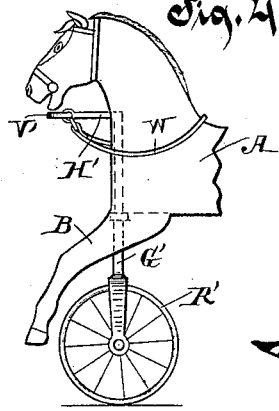

In the drawings, Figure 1 is an elevation of the complete device, parts being broken away and shown in section to exhibit interior construction. Fig. 2 is a view of the under side of the complete device. Fig. 3 is a detail. Fig. 4 is a fragment of a slightly-modified form of device.

The body A of the horse, with the fore legs B and rear legs C, as also the head and neck, are constructed integrally and are advisably made of wood, the body being hollowed out at the under side, forming a recess or cavity D. A doubly-cranked axle E has its bearings in boxes F, fixed on the rear legs of the horse near their extremities. The axle E is provided with wheels G G rigid thereon. Bent levers H H are pivoted medially at their respective angles on a pin I, inserted in the legs of a hanger K, fixed to the under side of the body of the horse. The rear ends of the levers H H are respectively connected to the cranks in the axle E by rods L, having pivotal attachment at both their ends. Stirrups M are suspended pivotally on the front ends of the levers H H.

By means of the mechanism just described the rider sitting on the horse and putting his feet in the stirrups is able by bearing down alternately in the stirrups to run the horse ahead, as desired.

A bar N is secured rigidly to the two fore feet of the horse, and short transverse bars O are pivoted to the bar N on the under side thereof near its respective ends. Bifurcate posts P, fixed in the bars O O, projecting downwardly therefrom, carry wheels R axled in the posts. A connecting-rod S, pivoted to the bars O O, connects them together at their rear ends. A vertical rock-shaft T, journaled in the bar N and in a bracket U, fixed to the body of the horse, is provided at its lower extremity with a fixed crank-arm T', which at its extremity is pivoted to the connecting-rod S. At its upper end the rock-shaft T is provided with a fixed lever or cross-head V, to the extremities of which the reins W are attached. By this mechanism the rider is able to guide the horse to the right or left by pulling on the right or left hand rein.

The saddle-seat B', located between the pommel C' and the cantle D', is supported yieldingly on a spring E', fixed at its lower end on the hanger K and provided at its upper end with a short post F', fixed on the spring, on which post the seat is fixed and supported. The pommel and the cantle are secured rigidly to the body of the horse, the seat B' being arranged to move vertically in a recess therefor in the body of the horse, and the post F' being located loosely in a slot therefor opening into the cavity D, in which the spring E' is located.

The levers H H are bent upwardly at the rear ends and are arranged to play in their cavity D, whereby their proper relation to the cranked axle E is provided for, and longer rods L, arranged at a desirable angle to the cranked axle and to the operating-levers H, are permitted to be used.

In the modified form of device shown in Fig. 4 a single front wheel R' is used, which is axled in the bifurcate lower extremity of a rocking post G', which is provided with proper bearings in the front part of the body of the horse, and has a crank-arm H' projecting forwardly from its upper end to near the mouth of the horse, the crank-arm being provided with a curved cross-head V', to which the reins W are attached at its respective ends.

What I claim as new, and desire to secure by Letters Patent, is—

1. The combination, with the body and legs of a hobby-horse, of a spring-supported seat, a doubly-cranked axle provided with fixed wheels journaled on the rear legs of the horse, bent oscillating levers pivoted medially in a hanger fixed to the horse, rods connecting the levers with the wrists of the cranked axle, stirrups pivoted in and suspended from the front ends of the levers, and means, substantially as described, for guiding the horse, as set forth.

2. In a hobby-horse, the combination, with the body and fore legs of the horse, of a pair of guiding-wheels R, axled in posts fixed in swinging bars, a rock-shaft having a crank-arm pivoted to a rod connected to the extremities of the wheel-carrying bars, a cross-head on the rock-shaft, and reins attached to the ends of the rock-shaft, substantially as described.

In testimony whereof I affix my signature in presence of two witnesses.

HENRY KOEPP.

Witnesses:
C. T. BENEDICT,
AUGUST OSTER.